(12) United States Patent
Fatemi et al.

(10) Patent No.: US 9,329,622 B2
(45) Date of Patent: May 3, 2016

(54) CYCLE STEALING WHEN A PROCESS OR ENVIRONMENTAL VARIATION IS DETECTED AND A PROCESSING INSTRUCTION IS USING A CRITICAL PATH

(71) Applicant: NXP B.V., Eindhoven (NL)

(72) Inventors: Hamed Fatemi, Eindhoven (NL); Rinze Ida Mechtildis Peter Meijer, Eindhoven (BE); Ghiath Al-Kadi, Eindhoven (NL); Surendra Guntur, Eindhoven (NL); Jan Hoogerbrugge, Eindhoven (NL)

(73) Assignee: NXP B.V., Eindhoven (NL)

( * ) Notice: Subject to any disclaimer, the term of this patent is extended or adjusted under 35 U.S.C. 154(b) by 245 days.

(21) Appl. No.: 14/244,757

(22) Filed: Apr. 3, 2014

(65) Prior Publication Data
US 2014/0317433 A1    Oct. 23, 2014

(30) Foreign Application Priority Data

Apr. 22, 2013    (EP) .................................. 13164744.8

(51) Int. Cl.
| | |
|---|---|
| *G06F 1/00* | (2006.01) |
| *G06F 1/04* | (2006.01) |
| *G06F 1/06* | (2006.01) |
| *G06F 1/08* | (2006.01) |
| *G06F 9/38* | (2006.01) |

(52) U.S. Cl.
CPC .. *G06F 1/06* (2013.01); *G06F 1/04* (2013.01); *G06F 1/08* (2013.01); *G06F 9/38* (2013.01)

(58) Field of Classification Search
CPC ............... G06F 1/04; G06F 1/06; G06F 1/08; G06F 9/38
USPC .......................................... 713/300, 600, 601
See application file for complete search history.

(56) References Cited

U.S. PATENT DOCUMENTS

| | | | |
|---|---|---|---|
| 5,859,986 A | 1/1999 | Marenin | |
| 6,873,707 B1 * | 3/2005 | Batcher | H04L 63/0428 380/255 |
| 8,269,544 B2 * | 9/2012 | Greenhill | H03L 7/18 327/262 |
| 8,374,729 B2 | 2/2013 | Chapel et al. | |
| 2007/0033427 A1 | 2/2007 | Correale, Jr. et al. | |
| 2010/0131791 A1 | 5/2010 | Kimura | |
| 2010/0182055 A1 | 7/2010 | Rozen | |
| 2012/0123608 A1 * | 5/2012 | Barton | G03G 15/2039 700/300 |
| 2013/0111425 A1 * | 5/2013 | Kumar | G06F 17/505 716/104 |

FOREIGN PATENT DOCUMENTS

EP        2 560 073 A1    2/2013

OTHER PUBLICATIONS

Ernst, D. et al. "Razor: Circuit-Level Correction of Timing Errors for Low-Power Operation", IEEE Micro, vol. 24, No. 6, pp. 10-20 (2004).
Sato, T et al. "A Simple Flip-Flop Circuit for Typical-Case Designs for DFM", Int. Symp. Quality Electionic Design, pp. 539-544 (Mar. 2007).
Lakshmanan, K. et al. "Mixed-Criticality Task Synchronization in Zero-Slack Scheduling", 17th IEEE Real-Time and Embedded Technology and Applications Symp., pp. 47-56 (Apr. 2011).
Sartori, J. et al. "Power Balanced Pipelines", Proc. of the Internt. Symp. on High Performance Computer Architecture, 12 pgs. (Feb. 2012).
Extended European Search Report for EP Patent Appln. No. 13164744.8 (Oct. 17, 2013).

* cited by examiner

*Primary Examiner* — Mark Connolly
(74) *Attorney, Agent, or Firm* — Rajeev Madnawat

(57) ABSTRACT

This invention provides a clock control circuit, which can be added to any pipeline-processor to solve timing problems arising from variations due to process outcome and environmental conditions. Critical instructions are detected (instructions that exercise critical paths) in conjunction with environmental sensing (such as process, temperature and voltage). This information is used to control cycle stealing.

15 Claims, 4 Drawing Sheets

CYCLE STEALING WHEN A PROCESS OR ENVIRONMENTAL VARIATION IS DETECTED AND A PROCESSING INSTRUCTION IS USING A CRITICAL PATH

CROSS-REFERENCE TO RELATED APPLICATIONS

This application claims the priority under 35 U.S.C. §119 of European patent application no. 13164744.8, filed on Apr. 22, 2013, the contents of which are incorporated by reference herein.

BACKGROUND

This invention relates to the control of clock signals used by a processor, in particular to selectively implement cycle stealing when it is required.

Design and fabrication technologies are successful in scaling down transistor dimensions to integrate more and more transistors in a single Integrated Circuit (IC) such as a System-on-Chip (SoC). Technology scaling also introduces major challenges such as high defect rate and device parameter variations. These variations change the propagation delay in CMOS circuits, which may lead to functional failures of the IC.

A traditional SoC design methodology attempts to meet the timing requirements by considering "worst case" (WC) operating conditions resulting in a reduced maximum operating frequency, and increased area and power overheads.

The alternative of a "typical case" design approach offers a better trade-off between area, performance and energy. However, the drawback of typical case design is timing errors which can occur due to reduced timing margins in critical paths when the dynamic operating conditions (e.g. temperature/voltage) are changed or aging which make circuits slower than the typical operating frequency.

There is therefore a need for a variation-resilient architectural solution for enabling better-than-worst case designed ICs in order to improve design specifications (speed, area, power) without sacrificing functional failures.

Many techniques have been implemented in the Central Processing Unit (CPU) architectures to overcome the timing problem explained above, so that processors operate correctly and become variation resilient.

One of the earlier techniques is referred to as Razor, which is based on error detection and recovery in the CPU for example by pausing all pipeline stages (or time borrowing) while waiting for the slow stage either to finish its computation or to allow the instruction to be re-executed. This approach is disclosed in Dan Ernst Razor: Circuit-Level Correction Of Timing Errors For Low-Power Operation. Proceedings of the 36th International Symposium on Microarchitecture MICRO-36 2003.

The pausing action ensures that later instructions do not continue to their next pipeline stage until the faulty instruction is recovered.

FIG. 1 shows the known architecture which uses Razor flip-flops to detect errors and recover by clock gating.

The drawback of this technique is the feedback signal, which needs to propagate to all pipeline stages in a very short amount of time (50% of one clock cycle when Razor circuits are used).

This can be difficult to achieve across large CMOS dies where pipeline stages are several millimeters apart. Furthermore, this is completely impractical to implement in complicated microprocessors because it may take several clock cycles just to propagate the clock signal through a clock distribution network, which cannot be halted in only one cycle.

Applying Razor like techniques also implies a 20 to 30% increase in the area of the CPU. This is due to the fact that the Razor flip-flop typically has more than twice the size of a regular master-slave flip-flop.

Another technique is error prediction. Toshinori Sato, in "A Simple Flip-Flop Circuit for Typical-Case Designs for DFM" ISQED 2007, proposed an architectural modification to the Razor approach to simplify the design. The idea is to have two flip-flops with the same clock (removing the short path problem that appears in Razor because of the delayed clock), but the shadow flip-flop has a delay buffer in the data path. This circuit predicts that the data path fails if the voltage keeps downscaling or if the frequency is further increased.

This technique cannot detect errors beyond the checking window (delay buffer). Also, if the technique is used for process compensation, meta-stability problems will appear in the main flip-flop.

Traditionally, the error detection and decision should be implemented in one or half a clock cycle, which is difficult to achieve in a large processor, and this problem is not resolved by the approaches outlined above.

SUMMARY

According to the invention, there is provided a method and apparatus as defined in the claims.

In one aspect, the invention provides a clock control circuit for controlling a clock signal used by a processing system which receives processing instructions, comprising:

a sensor arrangement for sensing process or environmental variations and determining therefrom whether or not cycle stealing may be required;

a detector arrangement for determining if a processing instruction uses a critical path in the processing system; and a clock control unit for implementing cycle stealing when it is determined by the sensor arrangement that cycle stealing may be required and when it is determined by the detector arrangement that the processing instruction uses a critical path.

Instead of detecting an error, the circuit of the invention can be used to predicts errors by analysing the processing instructions. For example, the analysis can be one or two cycles before the processing using the instruction, to avoid timing problems. This prediction can be executed in parallel with other units of the processor which gives more time for prediction.

The error prediction is disabled or enabled based on process variations, by sensing when the cycle stealing is not required, for example when there is no timing problem because there is no aging or the die is typical. In this way, the power consumption of the design is lowered compared to designs based on error detection which is always active.

The sensor arrangement preferably comprises one or more of:

a ring-oscillator sensor;
a temperature sensor;
a voltage supply drop sensor; and
an aging detector.

These different sensors can be used to determine whether or not any cycle stealing is necessary, which will be the case when the fabrication conditions or the environmental conditions mean the processing unit is operated outside its design tolerances.

The detector arrangement can comprise a database which stores information about at least each instruction supported by the processing system which uses a critical path. This enables the need for cycle stealing to be based on analysis of the processing instruction to be processed, rather than based on detection of errors.

The detector arrangement can comprise a partial decoder for partially decoding the processing instruction, and the database stores information accessed by the partially decoded instructions. A look up table can be used to store the information about the processing instructions, can this can include information that the processing instruction is a critical instruction and also for which processing unit (in the case that the processing system has multiple processing units) the instruction forms a critical path.

The invention also provides a processing system, comprising:

at least one processor;
a clock signal generator; and
a clock control circuit of the invention for processing the clock signal of the clock signal generator.

The system can comprise a plurality of processors, comprising at least a fetch unit, a control unit, and an execute unit. Thus, the system can be a CPU architecture.

The invention also provides a clock control method for controlling a clock signal used by a processing system which receives processing instructions, comprising:

sensing process or environmental variations and determining therefrom whether or not cycle stealing may be required;
determining if a processing instruction uses a critical path in the processing system; and
implementing cycle stealing when it is determined by the sensor arrangement that cycle stealing may be required and when it is determined by the detector arrangement that the processing instruction uses a critical path.

The sensing and determining preferably take place at least one clock cycle before any processing is implemented using the instruction, thereby providing a predictive approach.

BRIEF DESCRIPTION OF THE DRAWINGS

An example of the invention will now be described in detail with reference to the accompanying drawings, in which.

DETAILED DESCRIPTION

This invention provides a clock control circuit, which can be added to any pipeline-processor to solve timing problems arising from variations due to process outcome and environmental conditions. Critical instructions are detected (instructions that exercise critical paths) in conjunction with environmental sensing (such as process, temperature and voltage). This information is used to control cycle stealing.

The invention thus provides a variation-resilient architecture which enables better-than-worst-case CPU designs. The invention uses an intelligent error predictor which is based on the critical instructions. An intelligent pipeline stalling unit is used that can preserve the pipeline context and allow correct execution of critical instruction. There is only one clock cycle penalty if the critical instruction is executed.

Figure 1:
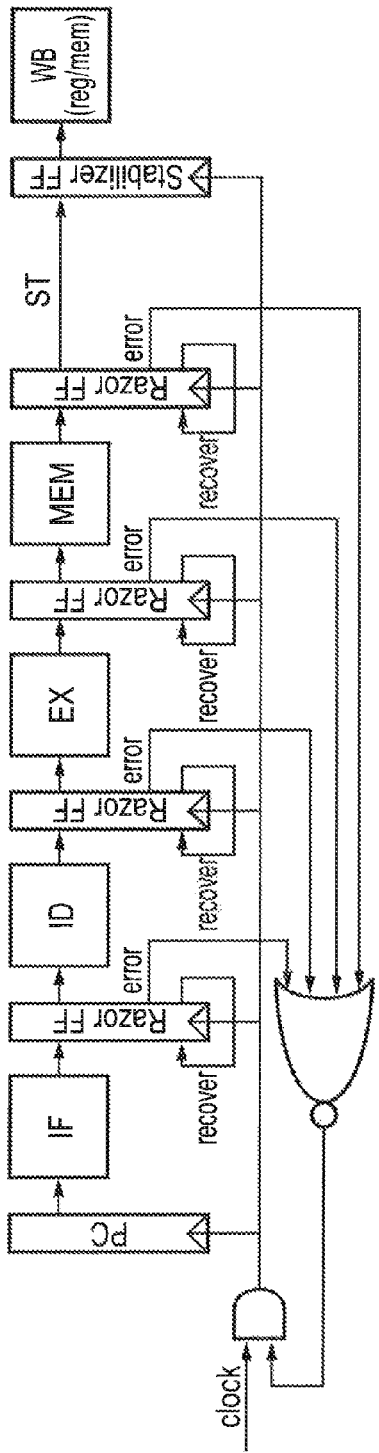
FIG. 1 shows a known approach for providing a variation resilient clock system.
Figure 2:
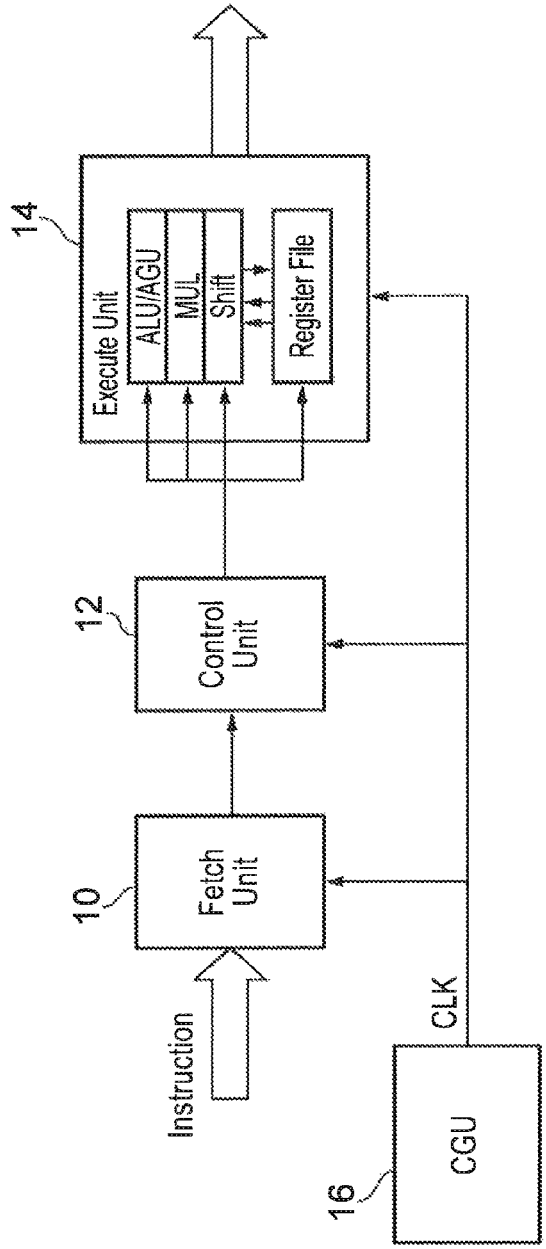
FIG. 2 shows the basic structure of a CPU architecture.

FIG. 2 shows a block diagram of a general purpose processor, and to which the system of the invention can be added.

In this example, the processor contains three pipeline stages; the first pipeline stage 10 is the fetch unit, the second one 12 the control (decode) unit and the third one is the execution unit 14.

It further contains a Clock Generation Unit (CGU) 16 that provides the clock signal to the different pipeline stages. Without loss of generality, the execution unit is shown to contain an Arithmetic Logic Unit (ALU), a Address generation Unit (AGU), a Multiplication unit (MUL), a shift unit (SHIFT) and a register file.

For executing a program, the following steps are followed by the processor:

The control unit sends a command to the AGU for sending the address of instruction to the program memory.
The fetch unit receives the instruction and sends it to the control unit.
The control unit decodes the instruction and sends the proper addresses and control signals to the register files and ALU/MUL/Shift units.
The execution unit executes the instruction and sends the result to the register files or memory.

The clock generator unit (CGU) is also sending clock to all parts of the processor.

Because of process variation, the processor can fail in the control or execution unit. Failure does not generally occur in the fetch unit because normally critical paths are in these two stages or the fetch unit is resilient. To avoid this functional failure and to be sure that the processor operates correctly, this invention modifies system by adding an intelligent detector.

Figure 3:
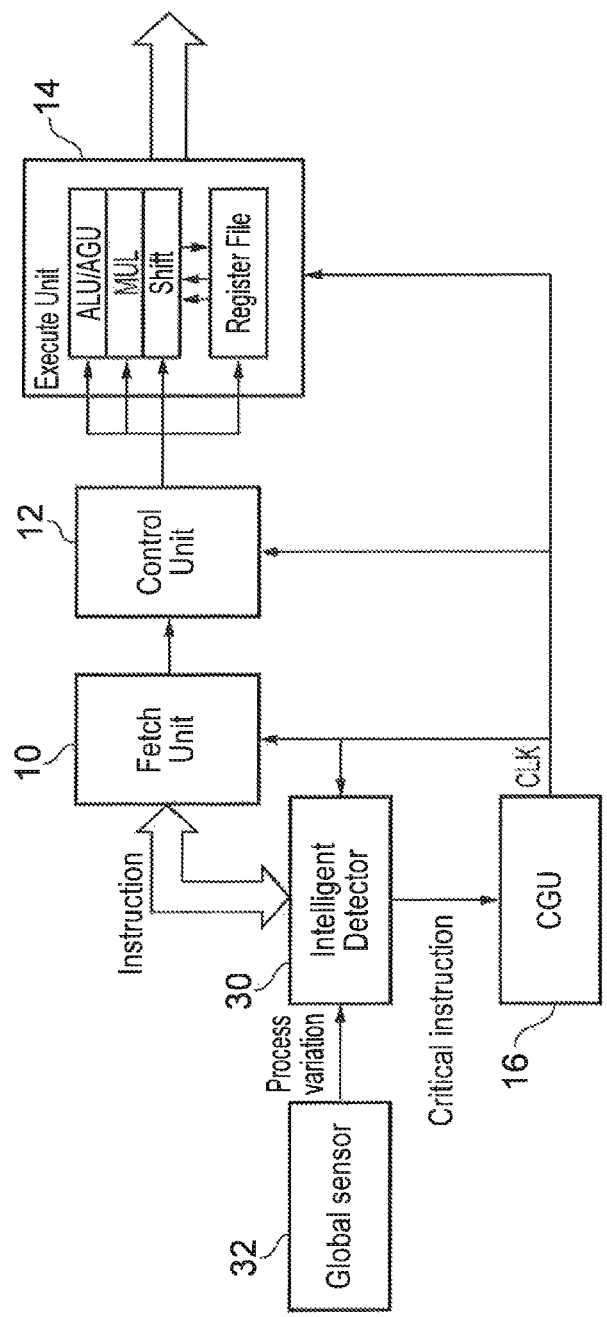
FIG. 3 shows how the structure of FIG. 2 can be modified in accordance with the invention.

FIG. 3 shows how the processor architecture of FIG. 2 is modified by the invention. The same components as in FIG. 2 are given the same reference numbers.

The instruction is provided not only to the fetch unit 10, but also to an intelligent detector unit 30, which provides a control input to the clock generation unit 16. The detector 30 receives process variation information from a global sensor 32.

The global sensor 32 enables or disables the intelligent detector function based on fabrication process state and environmental conditions. These can be detected by a ring oscillator which detects the chip speed, which in turn can vary independence on the process conditions.

The global sensor 32 is used to detect whether the architecture is working correctly (so that no correction is needed) or needs to predict errors (so that correction may be needed depending on the instruction).

The intelligent detector 30 is used for detecting the critical instructions.

The CGU unit 16 is modified to provide the function of removing (stealing) one clock when the critical instruction is in the control unit 12 or execution unit 14.

FIG. 3 shows a clock bus sent to the three processing units, and the cycle stealing takes place in the CGU 16. The control signal for the clock gating comes from the intelligent detector 30.

The added components are discussed in more detail below.
Intelligent Detector 30

For finding a critical instruction, it is necessary to specify which instructions are hitting the critical paths.

This can be carried out using offline simulation for each instruction, which is supported in the instruction set architecture of a given CPU. As result of this profiling, a sub-set of instructions is identified that exercises the critical path in the control or execute units. The critical instructions that have been identified are stored in, for example, a look-up table that is then part of the intelligent detector; this could be a full-form or a partial-from look up table.

Besides storing the critical instructions, information about where the instruction is critical is stored, e.g. critical for the control pipeline stage, and/or critical for the execution pipeline stage.

In one example, the operation of the intelligent detector is to partially decode the incoming instruction, and compare this partially decoded instruction with the critical instructions that are stored in the look-up table.

The partial decoding does not require control signals to be extracted for other parts of system (complete decoding is done in decode stage). The partial decoding only needs to identify the type of instruction, for example add or multiply.

If a critical instruction is identified, the intelligent detector provides a signal to the CGU 16 identifying for which pipeline stage the incoming instruction is critical.

Figure 4:
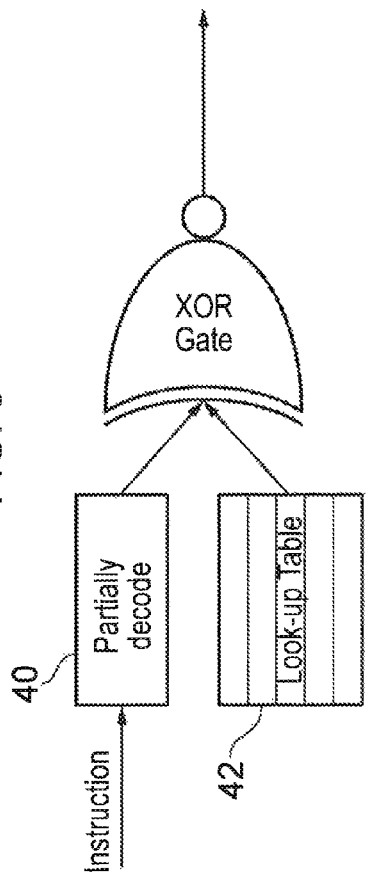
FIG. 4 shows an example of the detector used in the circuit of FIG. 3.

This process is shown in FIG. 4, in which a partial decoder 40 processes the instruction and compares the result with the contents of a look up table 42.

If the inputs of the XOR gate are equal then the output is 0 otherwise it is 1. With an inverted output, if the output signal is 1, then a critical instruction is detected.

Figure 5:
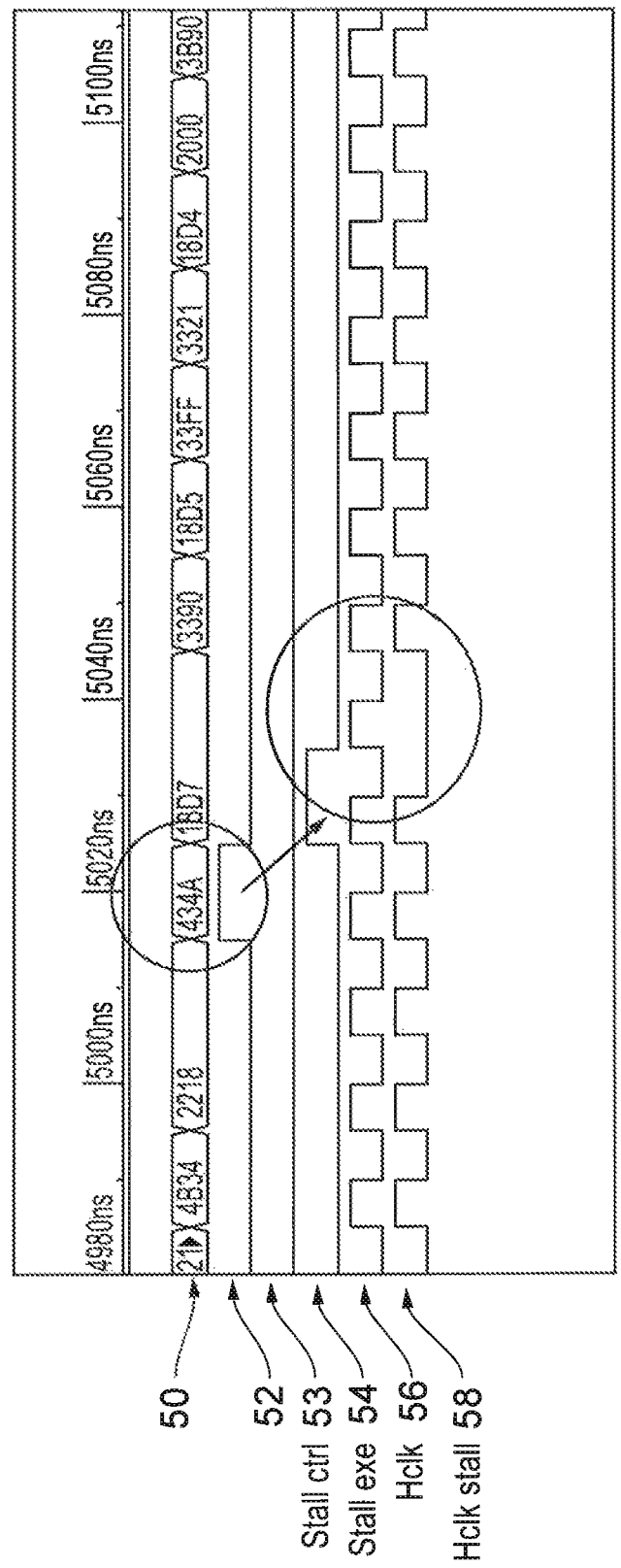
FIG. 5 is a timing diagram to explain the operation of the circuit.

FIG. 5 shows a series of instructions 50.

timing plots 52,54,56,58 show a signal 52 representing detection of a signal hitting a critical path, a stall control signal 53 which is active when the critical instruction occurs in the control unit (no example is shown in FIG. 5 of such an instruction so the plot is flat) and a stall execute signal 54 which is active when the critical instruction occurs in the execution stage. The basic clock Hclk is plot 56 and the clock after cycle stealing is plot 58.

FIG. 5 shows that when the instruction 434A in the series of instructions 50 is coming to the processor pipeline, the intelligent detector partially decodes it and sends a command to the CGU to steal one clock cycle (i.e. skipping one clock cycle) when it goes to execution stage. This is based on the information from the intelligent detector that the instruction hits the critical path in the execution stage. By stealing a single clock cycle, a delay of one clock cycle is introduced.

This process is only triggered when the global sensor has indicated that the measured operational performance is lower than a given threshold value.

The issue of path criticality is well known, and cycle stealing approaches are also well known. Cycle stealing involves skewing or time shifting the arrival of clocks feeding respective latches, so that the portion of time available for solving the logic in one circuit which does not have a critical timing issue is "stolen". This stolen portion is used as additional time to solve logic in a second circuit which is a critical circuit and therefore represents a bottleneck.

The invention enables a system to work correctly at higher frequencies, by dynamically adjust the clock and only if there is a need to steal a clock cycle. This causes less penalty for the throughput.

The invention thus resides in the control of the cycle stealing is required, rather than the actual process cycle stealing concept, which can be conventional

CGU 16

The CGU 16 steals one clock cycle from the processor pipeline based on the command from the intelligent detector. This command not only contains information that a critical instruction will occur, but also for which pipeline stage it occurs. The CGU will then steal the clock cycle when the instruction is executed in the respective pipeline stage. In the CPU architecture described above, the command that is generated based on the decision made in the intelligent controller runs in parallel with the fetch stage. Thus, the command will always come in a previous clock cycle compared the clock cycle where the data is arriving to the targeted stage. Therefore there is no timing issue for stealing a clock phase.

To describe the operation of the circuit, "stall exe" is used to identify that the critical instruction occurs in the execution stage, while "stall ctrl" is used to identify that the critical instruction occurs in the control unit.

FIG. 5 shows that when the "stall exe" signal 54 is active, the next "Hclk" clock pulse 56 does not propagate to the processor pipeline so that there is enough time to finish the current instruction. In this example, the critical instruction occurs in the execution stage.

The "Hclk stall" signal 58 shows the clock of the processor pipeline stages (called CLK in FIG. 3); one clock cycle has been stolen based on the information provided by the intelligent detector. The "Hclk" signal is the clock signal that is generated by the CGU from which the "Hclk stall" signal is derived.

Although one clock signal (or clock line) is used for the processor pipeline and the intelligent detector in the example shown, these clock lines can be separated.

Global Sensor 32

Figure 6:
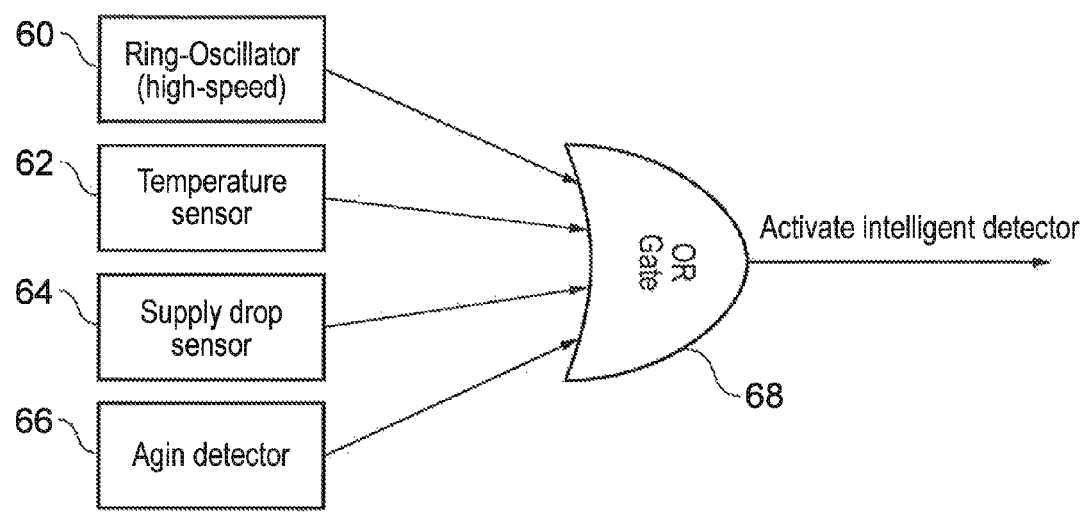
FIG. 6 shows an example of the sensor used in the circuit of FIG. 3.

The intelligent detector should only be active when there is a certain level of process or environmental variation present in the architecture. FIG. 6 shows an example of global sensor using a ring-oscillator sensor 60 for measuring circuit timing, temperature sensor 62, supply drop sensor 64 and aging detector 66 which can for example measure the performance degradation of a MOSFET. The various signals are provided to an OR gate 68 to generate the command to activate the intelligent detector. A Dynamic profiling unit can instead be used to detect when the intelligent detector needs to become active. This is a software sensor, for example based on checking the results of operations such as add, and using detection of errors to active the intelligent detector. Thus, the global sensor can be a collection of multiple sensors as shown.

The invention can be applied to most CPU architectures in modern systems where process and/or environmental variation affects the operation of the Integrated Circuit. The flexibility of the present invention enables several pipelined execution patterns making the design more tolerant to timing variations.

The invention claimed is:

1. A clock control circuit for controlling a clock signal used by a processing system which receives processing instructions, comprising:
   a sensor arrangement for sensing process or environmental variations and determining therefrom whether or not cycle stealing may be required;
   a detector arrangement for determining if a processing instruction uses a critical path in the processing system; and
   a clock control unit for implementing cycle stealing when it is determined by the sensor arrangement that cycle stealing may be required and when it is determined by the detector arrangement that the processing instruction uses a critical path.

2. A circuit as claimed in claim 1, wherein the sensor arrangement comprises one or more of:
   a ring-oscillator sensor;
   a temperature sensor;
   a voltage supply drop sensor; and
   an aging detector.

3. A circuit as claimed in claim 1, wherein the detector arrangement comprises a database which stores information about each instruction supported by the processing system which uses a critical path.

4. A circuit as claimed in claim 3, wherein the detector arrangement comprises a partial decoder for partially decoding the processing instruction, and the database stores information accessed by the partially decoded instructions.

5. A circuit as claimed in claim 3, wherein the detector arrangement comprises a look up table.

6. A circuit as claimed in claim 3, wherein the detector arrangement provides an output which indicates that the processing instruction is a critical instruction and identifies for which processing unit the instruction forms a critical path.

7. A processing system, comprising:
   at least one processor;
   a clock signal generator; and
   a clock control circuit as claimed in claim 1, for processing the clock signal of the clock signal generator.

8. A system as claimed in claim 7, comprising a plurality of processors, comprising at least a fetch unit, a control unit, and an execute unit.

9. A system as claimed in claim 7, comprising a CPU architecture.

10. A clock control method for controlling a clock signal used by a processing system which receives processing instructions, comprising:
    sensing process or environmental variations and determining therefrom whether or not cycle stealing may be required;
    determining if a processing instruction uses a critical path in the processing system; and
    implementing cycle stealing when it is determined by the sensor arrangement that cycle stealing may be required and when it is determined by the detector arrangement that the processing instruction uses a critical path.

11. A method as claimed in claim 10, wherein the sensing comprises sensing one or more of:
    circuit timing;
    temperature;
    a voltage supply drop; and
    aging conditions.

12. A method as claimed in claim 10, wherein the determining comprises comparing the processing instruction with a database which stores information about at least each instruction supported by the processing system which uses a critical path.

13. A method as claimed in claim 12, wherein the determining comprises partially decoding the processing instruction, and the database stored information accessed by the partially decoded instructions.

14. A method as claimed in claim 12, wherein the determining comprises indicates that the processing instruction is a critical instruction and identifying for which processing unit the instruction forms a critical path.

15. A method as claimed in claim 10, wherein the sensing and determining take place at least one clock cycle before any processing is implemented using the instruction.

* * * * *